Patented Sept. 4, 1928.

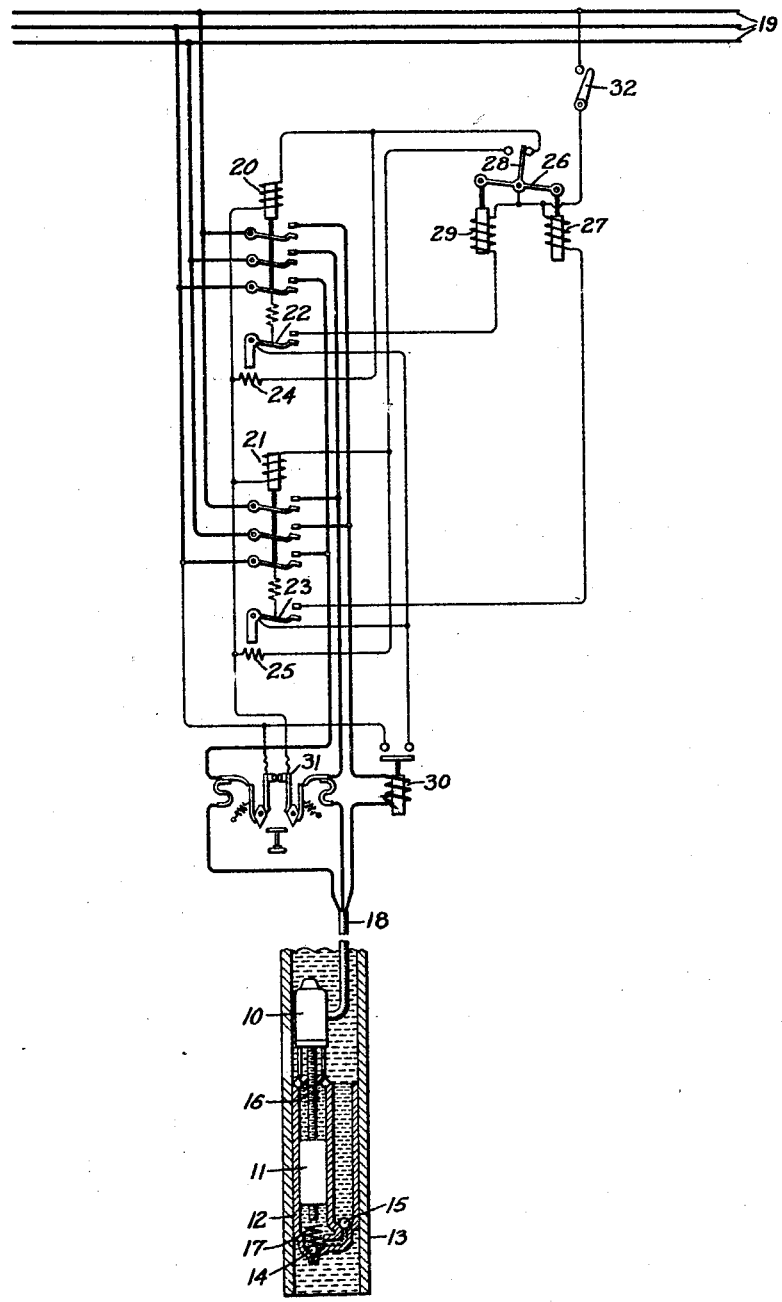

1,683,221

UNITED STATES PATENT OFFICE.

LOUIS J. WEBER, OF SCHENECTADY, NEW YORK, ASSIGNOR TO GENERAL ELECTRIC COMPANY, A CORPORATION OF NEW YORK.

MOTOR CONTROL.

Application filed July 15, 1926. Serial No. 122,726.

The invention relates to the control of electric motors, particularly reversible motors arranged for limited operation in at least one if not both directions of rotation. In the latter case, as where the motor is connected to drive directly a reversible device having fixed limits of operation, such for example as a reciprocating pump, planing machine, or the like, it is a common practice to reverse the device by reversing the driving motor through the agency of suitable limit switch mechanism upon reaching suitable limits of operation in each direction of operation.

The object of the present invention is to provide an improved form of control for automatically effecting the reversal of the motor when a desired limit of operation of the motor in either one or both directions of the operation is reached. Briefly, this is accomplished in accordance with a preferred form of my present invention by arranging the motor so that it is mechanically retarded preferably until it stalls when the desired limit of operation in either one or both directions is reached. This causes the motor power current to increase and I provide electro-responsive means operable responsively to the increased or stalled current of the motor for effecting a reversal thereof.

While my present invention has a wide field of application in all ordinary types of reversible motor control systems it is particularly advantageous for controlling a reversible electric motor under conditions where it is either desirable or imperative that all of the control apparatus be located remotely from the motor as well as from the device driven thereby. Under such conditions the use of the ordinary type of limit switch reversing control obviously is impossible. Thus where a motor is reversed to drive a reciprocating pump in each direction and the motor as well as the pump is to be operated at the bottom of a deep well casing of relatively small diameter, as in an oil well or the like, it is extremely desirable, if not absolutely necessary, for satisfactory operation, that the motor reversing control equipment be located above the top of the well. In such service my present invention enables all of the motor control equipment to be placed in a convenient and accessible location at the top of the well with only the electric power conductors or cable extending down the casing to the motor at the bottom of the well. As previously indicated, my improved motor reversing control equipment includes a suitable electroresponsive device which is operated responsively to the increased current of the motor flowing in the power conductors or cable when the motor is stalled and serves to periodically reverse the motor as it stalls at each limit of operation of the reciprocating pump.

In the accompanying drawing, the single figure diagrammatically illustrates the invention embodied in an automatic control system for reversing a three-phase alternating current motor connected to drive a reciprocating pump suitable for deep oil well service although it will be understood that the invention may be applied with equal advantage to control other types of electric motors in similar service.

Referring to the drawing, the reversible motor 10 which is to be controlled in accordance with my present invention is shown as of the three-phase alternating current type and is connected to drive the plunger 11 of the reciprocating pump 12 through the agency of suitable screw gear mechanism as illustrated in the drawing. While the design and structure of the reciprocating pump together with the mechanical connection of the motor thereof form no part of my present invention, it may be noted that the pump as shown is adapted to fit into and close the well casing 13. Also, the pump is provided with an inlet valve 14 to admit fluid into the cylinder of the pump when the piston is raised, as well as an outlet valve 15 for permitting the fluid to be forced upward in the well casing 13 when the pump piston is lowered.

As the automatic reversing of the motor 10 is dependent in accordance with my invention upon retarding or stalling the motor at both the up and down limit of operation of the pump piston, the pump preferably is provided with suitable buffer springs 16 and 17 in order to gradually retard the motor and thereby insure that the motor stalls without jamming or straining the pump drive mechanism.

Power is supplied to the motor 10 by the three conductor cable 18 from suitable three-phase alternating current supply lines 19 through one or the other of the separately operable electroresponsive reversing switches 20 and 21 which together with the other control equipment to be described hereinafter may be placed in a convenient location at the top of the well with only the power cable 18 connected directly to the motor 10 at the bottom of the well. The electroresponsive switches 20 and 21 are arranged in the well known manner to control the power connections of motor 10 so as to reverse the direction of rotation of the motor when one of the switches is opened and the other switch is closed. As shown the reversing switches 20 and 21 are each biased to the circuit opening position and operated electromechanically to the closed position, although it will be evident to those skilled in the art that other forms of reversing switch mechanism may be provided if desired.

It will be seen that the reversing switches 20 and 21 are provided respectively with the auxiliary time element control switches 22 and 23 which are each arranged to close a time interval after the closure of the corresponding reversing switch. While other types of time element switches may be employed, the time element switches 22 and 23 as illustrated diagrammatically in the drawing are of the form described and claimed in the Stack Patent No. 1,638,372, issued August 9, 1927, and are provided respectively with the operating windings 24 and 25 which are connected to be energized simultaneously with the energization of the operating windings of the corresponding reversing switch. The Stack type of time element device is adapted only for use in alternating current circuits. Briefly, the arrangement of this time element device is such that upon energization of the operating winding of the switch 20, the spring connection with the auxiliary time element control switch 22 is put under strain to operate the contact to the closed position. At the same time the winding 24 of the time element device is energized and attracts the magnetic element associated with the contact. Due to the fact that the winding 24 is energized with alternating current the attraction of the magnetic element is of a pulsating nature. Thus the magnetic element is periodically attached and released, thereby producing a time delay in the closure of contact 22.

The energizing circuits of the reversing switches 20 and 21 are under the control of the two position electroresponsive relay 26. In the form illustrated, the relay 26 is provided with a winding 27 for operating the pivoted relay contact 28 into the right hand position in which it is shown and with a winding 29 for operating the contact 28 into its left hand position.

In accordance with my present invention, the electroresponsive relay 30 is provided with an operating winding which is connected to be energized in accordance with the current of the motor 10 and is arranged to operate the relay to control the reversing of motor 10 responsively to a predetermined increase in the current supplied to motor 10 when it is mechanically retarded or stalled. Since the starting or inrush current of motor 10 also may be of sufficient value to effect operation of relay 30, the time element switches 22 and 23 described above are arranged to cooperate with the relay 30 so as to render the latter ineffective during the starting period of motor 10. The arrangement is such that the relay 30 cooperates with the time element switches 22 and 23 and the two position relay 26 to control the operation of the reversing switches 20 and 21 so as to periodically reverse the power connections of motor 10 when the motor is retarded and stalls at each limit of operation of the reciprocating pump 12 as will be described more fully in connection with the operation of my improved control system.

In accordance with the usual practice the motor 10 may be protected against excessive and prolonged overload current by a suitable time element overload protective device. As shown in the drawing such protection to motor 10 is afforded by the thermoresponsive overload protective device 31 which is described and claimed in the Hall Patent No. 1,527,645, dated February 24, 1925.

The operation of the automatic reversing control system with the several control elements in the positions shown in the drawing is as follows: To initiate operation of motor 10 the master control switch 32 is closed. This establishes an energizing circuit for the operating winding of the reversing switch 20 extending from the upper supply line 19 through switch 32, contact 28 of the two position relay 26, the operating winding of reversing switch 20 and through the contacts of the overload protective device 31 to the middle supply conductor 19. Reversing switch 20 at once closes and may be assumed to establish power connections for operating motor 10 in the direction of rotation required to raise the piston 11 of the reciprocating pump 12. At the same time the winding 24 of the time element switch 22 is energized in parallel circuit with the operating winding of switch 20 and serves to retard the closure of switch 22 for a time interval after the closure of switch 20. This time interval is sufficient to insure that in case relay 30 may be operated to the circuit closing position by the starting or inrush current of motor 10 still the relay is ineffective to control the energization of the two position relay 26. However, after the starting and acceleration of motor 10, relay 30 at once returns to the circuit opening position. Thus, after the lapse of the required time interval the switch 22 finally closes the contacts and the motor 10 continues to operate in the direction required to raise the plunger 11.

When the pump plunger 11 approaches its upper limit of operation and engages with the buffer spring 16, the motor 10 is gradually stalled, thereby causing the motor to receive an increased current from the supply lines 19 sufficient to effect operation of the relay 30 to close its contacts. This results in establishing an energizing circuit to the operating winding 29 of the relay 26, the circuit extending from the upper supply line 19 through the control switch 32, the winding 29, the contact of time element switch 22 which has closed as described above, the relay 30 and thence to the middle supply line 19. The resulting operation of the relay contact 28 from its right hand position to its left hand position serves first to deenergize the operating winding of the reversing switch 20 and thereafter to energize the operating winding of reversing switch 21 through a circuit substantially the same as that previously traced in connection with the energization of switch 20. The opening of switch 20 and the closing of switch 21 at once reverses the torque of motor 10 and the latter is set into operation in the direction of rotation required to lower the piston 11. After the starting or inrush current of motor 10 has decreased to normal value the relay 30 returns to the open position as shown in the drawing. Simultaneously with the closure of reversing switch 21 the operating winding 25 of the time element switch 23 is energized so as to delay the closure of the switch 23 for the time interval during which the relay 30 may be maintained in the circuit closing position by the starting or inrush current of motor 10. After the switch 23 is finally closed and the motor 10 has operated the pump piston 11 to its lower limit of operation the motor 10 again is retarded by engagement with the buffer spring 17 until the motor stalls and again the stalled motor current operates the relay 30 to the closed position. In this case closure of relay 30 establishes an energizing circuit for the winding 27 of the two position relay 26 extending through the time element switch 23. Thereupon relay 26 is returned to the position in which it is shown and functions to deenergize the operating winding of reversing switch 21 and again energizes the operating winding of switch 20.

It will be evident that upon the closure of reversing switch 20 the cycle of operation previously described will be repeated indefinitely to reverse the direction of rotation of motor 10 as the plunger 11 of the reciprocating pump 12 approaches each of its limits of operation, thereby causing the fluid in the well casing 13 to be pumped to the top of the casing.

From the foregoing it will be evident that my invention provides an improved form of reversing motor control that is well adapted for deep well motor driven pump control although it may be applied with equal advantage to other service. While I have described and illustrated the invention embodied in a preferred form of control apparatus, it will be understood that the apparatus shown may be varied considerably without departing from the true spirit and scope of my invention.

What I claim as new and desire to secure by Letters Patent of the United States is:

1. The combination with an electric motor, of means for automatically reversing the operation of the electric motor comprising a device for mechanically retarding the motor to cause the motor current to increase and an electromagnetically controlled reversing switch responsive to such increase in current.

2. In combination, an electric motor, a device reciprocated thereby between predetermined limits at which further operation of the device is arrested, causing the motor to stall and the motor current to increase, and a reversing control for said motor comprising means automatically operated responsively to the increase of the motor current by reason of the stalling of the motor for effecting automatic reversal of the motor.

3. The combination of an electric motor, means for reversing the direction of rotation of the motor, means for stalling the motor after limited operation thereof in each direction, and electroresponsive means connected to be energized in accordance with the stalled current of the motor for controlling operation of said reversing means to reverse the motor when the motor stalls.

4. The combination of an electric motor, means for reversing the direction of rotation of the motor, means for retarding the motor after a limited operation thereof in each direction to cause the motor power curent to increase, and electroresponsive means connected to be energized in accordance with the increased current of the motor for effecting operation of said reversing means to reverse the motor.

5. The combination of a reversible electric motor, electroresponsive reversing switch mechanism for establishing power connections to operate the motor in each direction, means for retarding the motor upon a predetermined operation thereof in at least one direction to cause the power current of the motor to increase, a relay electrically connected to the motor to be operated responsively to the increased power current of the motor, and means including connections controlled by the relay through which the energization of said electroresponsive reversing switch mechanism is controlled to reverse the motor upon the retardation thereof.

6. The combination of an electric motor, switch mechanism for reversing the power connections of the motor, means for stalling the motor after limited operation thereof in each direction, an electroresponsive device connected to be operated responsively to the stalled current of the motor, and means under the control of said electroresponsive means for operating said switch mechanism to reverse the motor power connections when the motor stalls.

7. The combination of a reversible electric motor, electroresponsive reversing switch mechanism for establishing power connections to operate the motor in each direction, means for stalling the motor upon a predetermined operation thereof in either direction, a relay electrically connected with the motor to be operated responsively to the stalled current of the motor, and means including connections controlled by the relay through which the energization of said electroresponsive reversing switch mechanism is controlled to reverse the motor upon the stalling thereof.

8. The combination of a reversible electric motor arranged to be stalled after limited operation thereof in each direction, switch mechanism for controlling the motor power connections to alternately operate the motor in each direction, and electroresponsive means electrically connected with the motor to be energized in accordance with the stalled current of the motor and arranged to effect operation of said switch mechanism upon each stalling of the motor.

9. The combination of an electric motor, a pair of separately operable switches, each for establishing power connections to operate the motor in a different direction of rotation, means for insuring operation of said switches to alternately operate the motor in each direction of rotation, means for stalling the motor after a limited operation thereof in each direction, and electroresponsive means connected to be energized in accordance with the stalled current of the motor and cooperating with said first means to control operation of said separately operable switch to reverse the motor power connections when the motor stalls.

10. The combination of a reversible electric motor, arranged to be stalled after limited operation thereof in each direction of rotation, a pair of separately operable electroresponsive switches, each for controlling power connections to operate the motor in a different direction or rotation, a relay for controlling the energization of said separately operable switches and arranged to effect operation of each switch to establish power connections controlled thereby after operation of the other switch to interrupt the power connections controlled thereby, and an electroresponsive relay connected in circuit with the motor to be energized in accordance with the stalled current of the motor in each direction of rotation thereof and arranged to effect operation of said first relay when the motor stalls.

11. The combination of a reversible electric motor arranged to be retarded after limited operation thereof in at least one direction of rotation to cause the motor current to increase above a predetermined value, means for reversing the direction of rotation of the motor, electroresponsive means connected to be operated responsively to said predetermined value of the motor current and arranged to effect operation of said means to reverse the motor, and means for rendering said electroresponsive means ineffective during the starting of the motor in said one direction of rotation.

12. The combination of a reversible electric motor, means for retarding the motor after limited operation thereof in each direction of rotation to cause the motor current to increase above a predetermined value, means for reversing the direction of rotation of the motor, electroresponsive means connected to be operated responsively to said predetermined value of the motor current and arranged to effect operation of said means to reverse the motor, and means cooperating with said electroresponsive means to prevent the reversing of the motor when the starting current of the motor in either direction exceeds said predetermined value.

13. The combination of a reversible electric motor arranged to be stalled after a limited operation thereof in each direction of rotation, electroresponsive reversing switch mechanism for the motor, an electroresponsive device connected in circuit with the motor arranged to be operated responsively to a predetermined value of current in the motor circuit, connections controlled by said device through which the energization of said electroresponsive switch mechanism is controlled to reverse the motor when the motor is stalled, and time element means associated with said reversing switch mechanism and cooperating with said device to prevent reversal of the motor when the starting current thereof exceeds said predetermined value.

In witness whereof, I have hereunto set my hand this 14th day of July 1926.

LOUIS J. WEBER.